United States Patent
Liu et al.

(10) Patent No.: US 11,339,253 B2
(45) Date of Patent: May 24, 2022

(54) END-GROUP FUNCTIONALIZED COMB STRUCTURE POLYCARBOXYLIC ACID AND METHOD FOR PREPARING THE SAME

(71) Applicant: BEIJING UNIVERSITY OF TECHNOLOGY, Beijing (CN)

(72) Inventors: Xiao Liu, Beijing (CN); Xiabing Bai, Beijing (CN); Jianan Guan, Beijing (CN); Ziming Wang, Beijing (CN); Guanghong Lai, Beijing (CN); Shanshan Qian, Beijing (CN); Qian Xu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 185 days.

(21) Appl. No.: 16/570,993

(22) Filed: Sep. 13, 2019

(65) Prior Publication Data
US 2020/0216619 A1    Jul. 9, 2020

(30) Foreign Application Priority Data

Jul. 26, 2018   (CN) .......................... 201810833933.7
Jul. 26, 2018   (CN) .......................... 201810835979.2

(51) Int. Cl.
*C08G 83/00*   (2006.01)
(52) U.S. Cl.
CPC ................... *C08G 83/002* (2013.01)
(58) Field of Classification Search
None
See application file for complete search history.

(56) References Cited

U.S. PATENT DOCUMENTS

2013/0065988 A1*   3/2013   Gamba ............... C08G 81/025
                                                          524/5

FOREIGN PATENT DOCUMENTS

| CN | 102030872 A |   | 4/2011 |
|----|-------------|---|--------|
| CN | 104030596 B |   | 6/2015 |
| CN | 106478904 A |   | 3/2017 |
| CN | 106632925 A |   | 5/2017 |
| CN | 107572859 A |   | 1/2018 |
| CN | 107663036 A |   | 2/2018 |
| CN | 109232820 A | * | 1/2019 |
| CN | 109232821 A | * | 1/2019 |

* cited by examiner

*Primary Examiner* — Christopher M Rodd
(74) *Attorney, Agent, or Firm* — J.C. Patents

(57) ABSTRACT

A method for preparing comb structure temperature/pH-responsive polycarboxylic acid by end-group functionalization adopts temperature/pH-responsive monomer, unsaturated halogenated hydrocarbon, small monomer of carboxylic acid and other raw materials to prepare polycarboxylic acid material via self-polymerization, substitution and copolymerization. Temperature/pH-responsive monomers are first self-polymerized to obtain temperature/pH-responsive polymer chain with end-group functionalization, and then substitution with unsaturated halogenated hydrocarbons is conducted to obtain temperature/pH-responsive macromonomers with end-group functionalization, finally the obtained product is copolymerized with small carboxylic acid monomers to prepare comb structure polymer with polycarboxylic acid main chain and temperature/pH-responsive side chain.

4 Claims, 5 Drawing Sheets

END-GROUP FUNCTIONALIZED COMB STRUCTURE POLYCARBOXYLIC ACID AND METHOD FOR PREPARING THE SAME

CROSS-REFERENCE TO RELATED APPLICATION

This application claims the priority benefit of Chinese applications serial No. 201810833933.7, filed on Jul. 26, 2018 and serial No 201810835979.2, filed on Jul. 26, 2018, which are hereby incorporated herein by reference in their entirety.

TECHNICAL FIELD

The present disclosure relates to a temperature/pH-responsive polycarboxylic acid material for cement concrete, especially to a specific preparation method for the synthesis of comb structure polycarboxylic acid materials. The preparation process mainly includes: temperature/pH-responsive monomers are first self-polymerized and then process substitution to obtain temperature/pH-responsive macromonomers with end-group functionalization, finally the obtained product is copolymerized with carboxylic acid monomers.

BACKGROUND ART

Concrete is the most widely used building material in modern construction engineering, with the development of science and technology, it is widely used in industry, water conservancy, agriculture, transportation and seaport. However, chemical deterioration and other problems are easy to occur in the application of concrete such as shrinkage and cracking, these will reduce the ability of concrete to resist external material erosion which resulting in the decline of durability. Early cracking of concrete occurs within 2 days after pouring, and sometimes even within 12 hours. The small cracks caused by shrinkage will develop rapidly in concrete under dry environment. The shrinkage cracking of concrete increases with the water-binder ratio. Plastic shrinkage makes its surface crack when concrete is in plastic stage, these cracks will continue to increase with the hardening of concrete, some even reach a few millimeters which has a negative impact and serious harm on the bearing capacity and service life of concrete.

As a kind of building material, concrete has the characteristics of strong compressive strength, convenient material selection and good durability, but at the same time, it also shows the weakness of low tensile strength, brittleness and poor crack resistance. Due to a series of problems such as deformation and restraint of concrete construction, concrete cracks have become the most common engineering diseases in the area of civil engineering, water conservancy engineering, bridge engineering, tunnel engineering and so on. Concrete cracking is mainly caused by shrinkage under restricted conditions which can be divided into plastic shrinkage, self-shrinkage, dry shrinkage, temperature shrinkage and carbonization shrinkage. These shrinkage cause the concrete to crack without load. The appearance of cracks will not only affect the beauty of the structure, reduce the impermeability and affect the use of the building function, but also cause steel corrosion, concrete carbonization, durability reduction of materials and affect the bearing capacity of the buildings. Shrinkage deformation is the key factor that leads to non-load crack of concrete structure, especially in application of high strength and high performance concrete which makes the problem of concrete crack more and more serious. Therefore, how to reduce the shrinkage of concrete has been a difficult problem in the concrete industry.

Environment-responsive polymer material refers to the polymer material that will produce changes in physical or chemical properties in a specific environment whose conformation and phase structure can be adjusted and changed to respond the environment changes. Based on the characteristics of environmental responsive polymers, intelligent polymer materials with specific responses can be designed according to the requirements. pH response is an important content of environmental response which is one of the hotspots in polymer surface interface chemistry. A large number of studies have been reported in recent years that the synthesis of amphiphilic polyblock copolymers can not only respond to changes in pH environment, but also form vesicles to carry drugs and other basic materials. It achieves excellent self-assembly and hydrophilic/hydrophobic transformation behavior in solvents which has a good application prospect in medicine, environmental protection, industrial production, biology and other fields.

Self-assembly of polymer refers to the process in which molecules spontaneously construct aggregates with special structures and shapes under the weak interaction forces such as van der Waals force, electrostatic interaction and hydrogen bonds. Amphiphilic polyblock polymers have chain segments that are compatible with both water and oil phases. In solution, the synergistic action of two blocks will lead to the self-assembly of polymers into molecular aggregates with rich morphological structures. Temperature-responsive multiblock polymers are one of the important branches of environmental responsive polymers. Its prominent feature is: the hydrodynamic volume changes significantly in the intelligent response process to realize the hydrophilic and hydrophobic conversion which has been widely used in sewage treatment, fluid drag reduction, environmental purification and other aspects. Due to its broad application prospect, it has aroused more and more interest of researchers and become an important research object in this frontier field.

Macromolecules with different structure forms can be modified and tailored effectively based on molecular structure design method which has become an important means for the synthesis of new polymers. Comb structure polymer can play the dual role of main chain and side chain which makes it become a special polymer with special characteristics. Therefore, we designed and synthesized comb structure pH-responsive polycarboxylic acids by functionalizing the end groups of pH-responsive monomers through interdisciplinary studies. By making full use of the functional characteristics of comb molecular structure, the target product not only has the excellent performance of traditional polycarboxylic acid, but also has the special advantage of pH responsiveness that achieves excellent anchoring adsorption of cement particles, exert the synergistic effect of macromolecular main chain and side chain and show a good prospect of application and popularization.

The continuous development of polymer molecular structure design and synthesis technology provides a theoretical basis for our synthesis of ideal polymer molecular structure. Temperature-responsive comb polymer material have good water solubility, wettability and phase denaturation due to its unique molecular structure and temperature response characteristics. Therefore, we functionalized the end groups of temperature-responsive monomers through the molecular structure design method to design and synthesize the comb structure temperature-responsive polycarboxylic acid which gives full play to the synergistic effect of the main chain anchorage and side chain response of macromolecular. It also achieves excellent resistance of shrinkage cracking effect and shows good application value.

Chinese patent CN107663036A (publication date Feb. 2, 2018) disclosed a preparation method of concrete shrinkage reducing agent which belongs to the technical field of concrete admixture material. The hydrophobic group of the reducing agent material in the invention can aggregate on the surface of the aqueous solution and reduce the surface tension, with the further increase of dosage, the shrinkage reducing agent will produce partial agglomeration and reduce the surface tension. Its working principle is to reduce the evaporation of water in the mortar pore solution; reduce shrinkage while at the same time reduce the surface tension effectively in the capillary pore solution; reduce the capillary pore pressure, thereby inhibiting concrete cracking. Moreover, calcium carbide particles are modified by adding gas to limit the contact between water and calcium carbide which reduce the rate of gas generation. A layer of hate water film is coated on calcium carbide to block its contact with water, then water slowly permeate into calcium carbide and gas slowly released under the swelling effect of resin, so as to effectively improve the material's gas and antifreeze performance. However, the synthesis process of the invention is relatively complex and requires high production equipment, and the pH response characteristic is not applied to the field of improving the shrinkage performance of cement concrete.

Chinese patent CN104030596B (publication date Jun. 17, 2016) disclosed a shrinkage reducing agent for non-alkali crack resistant concrete which consists of the following percentages by weight: 3%-66% first grade fly ash; 8%-18% polypropylene staple fiber; 2%-18% polyethylene glycol; 3%-17% methacrylic acid; 2%-15% calcium formate; 3%-16% neopentyl glycol; 0.2%-0.8% sodium dodecylbenzene sulfonate. The invention developed a kind of green environmental protection and non-pollution concrete shrinkage reducing agent with alkali and cracking resistance, it realized the comprehensive improvement of the application technology of shrinkage reducing admixture. The shrinkage reducing agent can reduce concrete shrinkage, restrain non-load cracks, improve concrete durability with simple feeding mode and easy controllable production conditions. The produced non-alkali and cracking resistant concrete shrinkage reducing agent with low alkali content and low content has a good social and economic benefits. However, the shrinkage reducing agent reported is only a simple physical blend so that it fails to achieve the purpose of functional polymer by molecular structure design method. It does not have pH response characteristics and cannot respond to the effect of shrinkage and crack resistance in a specific environment.

Chinese patent CN106478904A (publication date Mar. 8, 2017) disclosed a preparation method of pH-sensitive multiblock copolymer material P(MMA-co-DMAEMA)-b-PPEGMA. Firstly, poly (methyl methacrylate-co-dimethylaminoethyl methacrylate) are synthesized by reversible addition-chain breaking transfer polymerization, then the synthesized poly (methyl methacrylate-co-methyl methacrylate dimethylamino-ethyl ester) is used as a macromolecular chain transfer agent react with glycol methyl ether methacrylate for a second reversible addition-broken chain transfer polymerization to obtain P(MMA-co-DMAEMA)-b-PPEGMA. The critical pH value of the micelle formed by the copolymer is 6, which shows a good pH response characteristics. The invention has the characteristics of: simple and convenient, high yield of preparation, no pollution of the environment and so on. Moreover, the prepared polymer material has narrow molecular weight distribution and can be applied to specific adsorption anticancer drugs in vivo transportation and other fields. However, the production process of the invention has high equipment requirements and high production energy consumption, it has not been applied in concrete and other construction engineering materials too.

Chinese patent CN102030872A (publication date Apr. 27, 2011) disclosed a preparation method of comb structure copolymer reducing agent which synthesized through free radical copolymerization reaction by combining monomer A (large ether monomer containing unsaturated double bond), monomer B ((methyl) acrylic acid or its salt), monomer C (alkoxy polyether (methyl) acrylate) and monomer D (maleic anhydride single ester or double ester) under the action of initiator. The pH value was adjusted to 6.0-8.0 after the reaction. The molar ratio of monomer A:monomer B:monomer C:monomer D is 1.0:0.2-1.0:0-1.0:0-1.0:0-1.0. The synthetic process of the invention is easy to control, without cross link, and can achieve good shrinkage effect at a low dosage. The disadvantages of reducing strength of alcohol shrinkage reducer and polyether shrinkage reducer are changed. The compressive strength of 28d is higher than that of reference concrete. The invention has the advantages of simple steps and strong operability, but the method used in the synthesis of macromonomers is esterification reaction which requires high temperature, long reaction time, high energy consumption and high requirements for production equipment. It will greatly affect the industrial production of polycarboxylic acid materials and does not apply the temperature response characteristics of improving the shrinkage performance of cement concrete.

Chinese patent CN107572859B (publication date Jan. 12, 2018) disclosed a regenerated concrete shrinkage reducing agent, which comprises the following raw materials by weight: 3-6 parts sodium silicate, 0.5-2 parts calcium oxide, 15-28 parts polyacrylamide, 45-60 parts fly ash, 0.1-0.8 parts potassium silicate, 2-8 parts polyethylene glycol, 1-4 parts polypropylene fiber, 2-5 parts aloe, 3-12 parts cofilm-forming substances and 50-70 parts water. The product of the invention penetrates into the interior of the recycled concrete and fills the micro-pores of the recycled concrete or reacts with the substances in the recycled concrete. Expansion compactness materials is generated to reduce the surface tension of the water inside the capillaries and the shrinkage of recycled concrete while at the same time a water-retaining film is formed by water glass and auxiliary film-forming substance which can prevent the evaporation of water and shrinkage reducing agent. This product is non-toxic, tasteless, pollution-free to the environment and suitable for all kinds of environment and conditions of recycled concrete surface. Its good water-retaining capacity can effectively control the shrinkage and cracking of recycled concrete which has excellent application potential. However, the invention only realizes polymer functionalization through simple physical blending rather than molecular structure design, and the production equipment requirements and energy consumption are high which will increase production costs, and has not been applied in concrete and other construction engineering materials.

Chinese patent CN106632925A (publication date Mar. 10, 2017) disclosed a preparation method and application of chitosan temperature-sensitive block copolymer, including the following steps: chitosan CS was dissolved in a solvent and mixed with methanol until clarification, then add acetic anhydride solution, stir at room temperature and precipitate, next cetylated chitosan obtained by filtration and drying is dissolved in solvent with stirring. Chain transfer agent, catalyst, dehydrating agent is added with stirring at room temperature, RAFT reagent from chitosan is obtained after purification and freeze-drying. Under nitrogen protection, NIPAM and initiator are added to react with oil bath to obtain the chitosan temperature-sensitive block copolymer cs-g-nipam after purification. The invention adopts the controllable RAFT method, with stable reaction, no detonation, and narrow molecular weight distribution of cs-g-nipam which can be widely used in medical, hydrogels and other fields. However, the method has strict requirements on catalysts and reaction conditions, cumbersome production process, high polymerization cost, and does not expand new molecular structure morphology, nor does it combine temperature response characteristics with the effect of inhibiting shrinkage and cracking of cement concrete.

Although the polymer material for concrete disclosed in the above patents have good performance of inhibiting shrinkage and resisting cracking, the products obtained by the above synthesis methods have some deficiencies. Most of the researchers achieved the purpose of inhibiting concrete shrinkage and cracking by reducing surface tension or mixing surface active substances. However, pH-sensitive polymers are rarely designed and synthesized to achieve the hydrophobic effect of materials from the inside to the outside. Moreover, the advantage of main chain and side chain of comb molecular structure is not fully utilized. The synthesis method of active polymerization is difficult to be applied in the field of cement concrete due to the complex reaction system and conditions. Experiments have proved that the comb macromolecules with pH-responsive block structure can effectively improve the shrinkage and crack resistance of concrete. Therefore, this requires the preparation of polycarboxylic acid material is not limited to the currently reported synthesis method, pH-responsive characteristics are obtained at the molecular structure level which not only has the characteristic properties of inhibiting shrinkage and resisting cracking, but also is conducive to industrial production and popularization. There is no reports have been disclosed on this aspect all over the world.

The shrinkage reducing materials for concrete disclosed in most patents have good performance characteristics of inhibiting internal moisture evaporation and reducing shrinkage cracking. However, the above preparation methods have some shortcomings. The reduction effect is still dependent on the traditional ideas and means of reducing surface tension that the temperature response behavior in surface interface chemistry is not considered in the field of shrinkage and cracking of cement concrete. In addition, in the preparation of materials, physical blending or transformation process are mostly used in a single way, and molecular structure design is rarely used to realize the real regulation of its application performance. Experimental results show that temperature-responsive macromolecules can effectively improve the shrinkage and crack resistance of concrete, while most active polymerization methods have limited their industrial application potential due to the complexity and rigor reaction process. Therefore, this requires subversive design of molecular structure of polycarboxylic acid preparation material. To determine the reasonable synthesis method and guarantee the operability and universality, the characteristic performance of restraining shrinkage and cracking of cement concrete by excellent temperature response behavior is achieved which has the value of industrial production and application. There is no report on this aspect in the world too.

SUMMARY

The purpose of the present disclosure is to provide a method for preparing comb structure temperature/pH-responsive polycarboxylic acid by end group functionalization. Functionalized temperature/pH-responsive polymer chains which synthesized by self-polymerization of temperature/pH-responsive monomer under the action of initiators and end-group functionalizers is substituted with unsaturated halogenated hydrocarbons under the action of catalysts to obtain temperature/pH-responsive macromonomer; the temperature/pH-responsive macromonomer copolymerizes with small carboxylic acid monomers under the action of initiator to obtain comb structure temperature/pH-responsive polycarboxylic acid materials. The invention introduces the technology of end-group functionalization and, according to the theory of molecular structure design to prepare a temperature/pH-responsive polymer with comb polymer side chain, polycarboxylic acids main chain binds with comb polymer. It can synergistically produce anchorage adsorption and temperature/pH response characteristics, effectively improve work efficiency, and enrich the application of end-group functionalization technology in the preparation of functional polycarboxylic acid materials.

The polycarboxylic acid material synthesized by this method has different functional characteristics from conventional comb molecular structure, Its temperature-responsive side chain is fully expanded in the slurry pore solution, and hydrophilic/hydrophobic changes occur with the slurry temperature changes which effectively reduce the shrinkage pressure of the capillary pores in cement concrete. It is also a new type of polymer which is different from the mechanism of traditional polycarboxylic acid reducing agent. Polycarboxylic acid main chain is anchored and adsorbed on the surface of cement particles, temperature-responsive side chain of block segment can conduct hydrophilic/hydrophobic transformation in response to the change of pH value outside so as to better inhibit the shrinkage and cracking of cement concrete from the inside of the material. It shows a better working characteristics and effect than the ordinary polycarboxylic acid material.

A method for preparing comb structure temperature/pH-responsive polycarboxylic acid materials by end-group functionalization comprising: the comb structure temperature/pH-responsive polycarboxylic acid materials is prepared by means of: self-polymerization, substitution and co-polymerization, comprising the following steps:

(1) Self-polymerization: firstly, the organic solvent is added to the reactor and heat to 50-120° C., introduce the initiator with 10-30 minutes agitation until the mixture is evenly mixed, and then the mixture solution of temperature/pH-responsive monomer and end-group functional agent is introduced for 1-12 hours, after dropping, the self-polymerization product solution is obtained by reaction at a constant temperature of 50-120° C. for 1-6 hours.

(2) Substitution: unsaturated halogenated hydrocarbons, acid-binding agents and catalysts are successively added into the self-polymerization product solution obtained in step (1), adjust the temperature to 30-120° C. with agitation, the reaction is kept at a constant temperature of 30-120° C. for 2-15 hours to obtain unsaturated temperature/pH-responsive macromonomers by decompressed distillation.

(3) Co-polymerization: the unsaturated temperature/pH-responsive macromonomer obtained in step (2) is dissolved in solvent water and heat to 50-90° C., agitate 10-30 minutes until the mixture is evenly mixed, aqueous solution of initiator with 1-10% mass fraction, aqueous solution of carboxylic acid small monomer with 1-30% mass fraction and aqueous solution of chain transfer agent with 1-5% mass fraction are added at the same time for 1-6 hours, after dropping, the reaction is kept at a constant temperature of 50-90° C. for 1-6 hours, to obtain the temperature/pH-responsive polycarboxylic acid solution with the required concentration is after adding the water.

(4) Organic solvent used in the self-polymerization reaction in (1) is: tetrahydrofuran, N, N-dimethyl formamide, aniline, cyclobutyl sulfoxide or dimethyl sulfoxide, the mass ratio of organic solvent to temperature/pH-responsive monomer is 1-12:1; the initiator used in the self-polymerization reaction in (1) is: azodiisobutyl nitrile, azodiisoheptyl nitrile, dibenzoyl peroxide, tert-butyl hydrogen peroxide, tert-butyl peroxide benzoate or ditert-butyl peroxide, the molar ratio of initiator to temperature/pH-responsive monomer is 0.05-0.2:1; the temperature-responsive monomer used in the self-polymerization reaction in (1) is: N-Isopropyl acrylamide, N-isopropyl methylacrylamide, N-n-propyl acrylamide, N-tert-butyl acrylamide, N,N'-methylene diacrylamide or N,N-dimethylacrylamide; the pH-responsive monomer used in the self-polymerization reaction in (1) is: dimethylamino-ethyl acrylate, dimethylamino-ethyl methacrylate, diethylamino-ethyl methacrylate, 2-vinyl pyridine, 4-vinyl pyridine or N,N-diethyl-2-acrylamide; the end group functionalizing agent used in the self-polymerization reaction in (1) is: 6-mercapto hexanol, 2-mercapto ethanol or 3-mercapto propanol, the molar ratio of end group functionalizing agent to temperature/pH-responsive monomer is 0.05-0.6:1;

unsaturated halogenated hydrocarbon used in the substitution reaction in (2) is: allyl chloride, allyl bromide, 3-chloro-2-methylpropylene, 4-bromo-1-butene or 1-chloro-3-methyl-2-butene, the molar ratio of unsaturated halogenated hydrocarbon to self-polymerization product in (1) is 1-4:1; acid-binding agents used in the substitution reaction in (2) is: triethylamine, N,N-diisopropyl ethylamine, tetramethylenediamine or pyridine, the molar ratio of acid-binding agents to self-polymerization product in (1) is 2-12:1; catalysts used in the substitution reaction in (2) is: ammonium tetrabutyl sulfate, benzyl trimethylammonium chloride, benzyl triethyl ammonium chloride, tetrabutyl ammonium chloride, tetrabutyl ammonium bromide or tetrabutyl ammonium iodide, the molar ratio of catalysts to self-polymerization product in (1) is 0.02-0.06:1.

The mass ratio between the amount of solvent water used in the copolymerization reaction described in (3) above and the unsaturated temperature/pH-responsive macromonomer obtained in (2) is 0.5-1.2:1; the solute in initiator aqueous solution is: ammonium persulfate, potassium persulfate, sodium persulfate, or hydrogen peroxide, the molar ratio of solute to unsaturated temperature/pH-responsive macromonomer in (2) is: 0.05-0.2:1; the solute in carboxylic acid small monomer aqueous solution is: crylic acid, methacrylic acid, iconic acid, maleic anhydride or fumaric acid, the molar ratio of solute to unsaturated temperature/pH-responsive macromonomer in (2) is: 1-10:1; the solute in chain transfer agent aqueous solution is: Isopropanol, thioglycolic acid, 3-thioglycolic acid or sodium formate, the molar ratio of solute to unsaturated temperature/pH-responsive macromonomer in (2) is: 0.05-0.6:1.

The comb structure temperature/pH-responsive polycarboxylic acid materials prepared according to claim 1, wherein Its structural expression is:

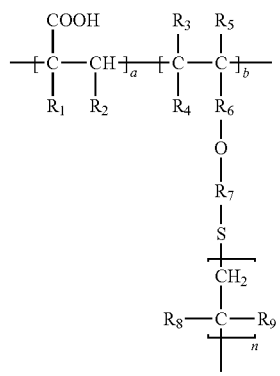

As for comb structure temperature-responsive polycarboxylic acid, wherein $R_1$ represents hydrogen, methyl, or methylene carboxyl groups; $R_2$ represents hydrogen or carboxyl; $R_3$, $R_4$ and $R_5$ represents hydrogen or methyl; $R_6$ represents methylene or dimethylene; $R_7$ represents dimethylene, trimethylene, or hexamethylene; $R_8$ represents N-Isopropyl methyl amides, N-n-propyl amides, N-tert-butyl amides, N-methylene, N,N'-acrylamide or N,N-dimethyl acyl; $R_9$ represents hydrogen or methyl.

As for comb structure pH-responsive polycarboxylic acid, wherein $R_1$ represents hydrogen, methyl, or methylene carboxyl groups; $R_2$ represents hydrogen or carboxyl; $R_3$, $R_4$ and $R_5$ represents hydrogen or methyl; $R_6$ represents methylene or dimethylene; $R_7$ represents dimethylene, trimethylene, or hexamethylene; $R_8$ represents dimethylaminoethyl, diethylamino-ethyl, 2-pyridine, 4-pyridine, or N,N-diethyl-2-amide; $R_9$ represents hydrogen or methyl.

Wherein "a" and "b" are positive integers which represent the number of repeating units distributed randomly in the aggregation, a:b=1-10:1;

Wherein "n" is a positive integer, indicating the number of repeat units in the side chain. The range of "n" is 5-120.

The prepared temperature/pH-responsive polycarboxylic acid by the invention has a typical comb structure. Its polycarboxylic acid main chain adsorb on cement particles, and its temperature/pH-responsive polymer side chain can achieve hydrophilic/hydrophobic conversion through excellent temperature/pH response characteristics which Increasing the contact angle of liquid bending surface of capillary in cement concrete, reducing the capillary pressure and further realizing the effect of restraining shrinkage and cracking of cement concrete.

The temperature-responsive polycarboxylic acid material in the present invention has the following beneficial effects compared with the existing technology:

1. A comb structure temperature-responsive polycarboxylic acid material with polycarboxylic acid main chain and temperature-responsive polymer side chain is formed based on the molecular structure design theory and the end-group functional synthesis technology by means of: self-polymerization of temperature-responsive monomer, substitution and co-polymerization.

It Is an innovation and breakthrough in preparation of comb structure polycarboxylic acid. It not only reduces the dependence on traditional side chain raw materials such as polyether and preparation methods like esterification, but also enriched the means of synthesis of functional comb structure polycarboxylic acid, pointing out the research direction and development trend for further research and development of new varieties and new types of polycarboxylic acid materials.

2. The synthesized temperature-responsive comb structure polycarboxylic acid material can give full play to its temperature response behavior through its macromolecules side chain, and realize hydrophilic/hydrophobic transformation based on the change of internal temperature of cement slurry which effectively reduce the pressure of capillary pore inside the slurry and the probability of matrix material shrinkage cracking. This kind of comb structure can not only improve the working efficiency, but also prevent cement agglomeration and improve the stability of cement slurry. The synthetic product is a typical functional polymer material with wide application range, obvious performance advantages and broad development prospects and market demand.

3. The preparation process of the invention has the advantages of low energy consumption, high yield, friendly environmentally, non-toxic and pollution-free without refining and purifying of the reaction raw materials. The organic solvents is recycled after separation which greatly reduces the production cost and conforms to the concept of resource conservation and recycling economy. At the same time, the temperature-responsive monomer raw materials used have a wide range of applicable molecular weight which is conducive to the wide spread and application of diversified products and greatly shortens the development period of new polycarboxylic acid materials.

4. Compared with the traditional synthesis method, the raw materials is commonly used with simple steps and operation. Substitution and copolymerization reactions involving end-group functionalization technologies are also common operating processes without special processes or complex equipment requirements. It enriches the preparation method of high-performance synthetic polycarboxylic acid material which is characterized by remarkable accuracy, efficiency, speed, convenience, and easy to realize industrial production. The polycarboxylic acid material synthesized by the invention has the advantages of high degree of polymerization, controllable synthesis process, narrow molecular weight distribution, clear structure information, strong molecular designability and so on which has great research potential and development advantages.

5. The temperature-responsive polycarboxylic acid material with comb structure synthesized by the invention presents an intelligent response behavior with the increase of temperature and realizes the transformation from hydrophilic to hydrophobic. The particle size and light transmittance in the solution have the same characteristics of mutability. The addition of cement mortar can play a good role in inhibiting shrinkage and resisting cracking, and the performance is consistent at different ages.

The pH-responsive polycarboxylic acid material in the invention has the following beneficial effects compared with the existing technology:

1. A comb structure pH-responsive polycarboxylic acid material with polycarboxylic acid main chain and pH-responsive polymer block side chain is formed based on the molecular structure design theory by means of self-polymerization of pH-responsive monomer, substitution and co-polymerization. Different from traditional comb structure polycarboxylic acid, its polycarboxylic acid side chain has the characteristics of pH response. which is an innovation and breakthrough in the preparation of functional polymer for cement concrete and broads the thinking and direction for further development of new polycarboxylic acid materials.

2. The polycarboxylic acid material synthesized by the method of the invention has macromolecule polycarboxylic acid main chain which anchored and adsorbed on the surface of cement particles, and a large number of pH sensitive groups contains on its side chain which can respond to the pH value of the environment for hydrophilic and hydrophobic conversion. It is conducive to exert the effect of inhibiting shrinkage and improving the stability and durability of concrete. The product can also be used in the fields of fine chemicals and surfactants in a diversified way with special advantages and distinct characteristics, which has a good market competitiveness and application prospect.

3. The synthesis process disclosed by the invention is mild and easy to operate. The whole reaction process is carried out at medium and low temperature with green raw material, low energy consumption and small temperature fluctuation range. It is conducive to maintaining the smooth progress of the reaction system, reducing the occurrence of side reactions and ensuring the production rate of reaction products. The solvent used in self-polymerization is same as in the substitution which can be recycled after condensation recovery, reducing the production cost greatly. At the same time, the applicable molecular weight range of raw materials is wide which is conducive to the extensive promotion and application of diversified products.

4. The synthesis process disclosed in the invention is simple, easy to control, efficient and convenient. The raw materials used in the reaction are commonly available. The steps of self-polymerization, substitution and co-polymerization are also common preparation processes without dependent on flammable and explosive chemical raw materials, special requirements for equipment or complex catalytic system. It enriches the preparation methods of polycarboxylic acid materials and is easy to realize industrial production. The polycarboxylic acid material synthesized by the invention has the advantages of: controllable molecular weight, high degree of polymerization, narrow molecular weight distribution, strong molecular design ability that has good application value and development potential.

5. The pH-responsive polycarboxylic acid material synthesized by the method of the invention is near the pH response point, its particle size obviously increases and the light transmittance greatly decreases. Under the condition of high pH value, it can achieve significant pH response behavior, showing better effect of inhibiting concrete shrinkage and cracking than traditional polycarboxylic acid which shows consistent performance at low dosage and different ages. In addition, the product synthesized by the invention is in a stable state which is not turbid after being placed at high concentration, does not deteriorate after long-term storage and presents excellent performance indexes. It meets the demand of volume stability of building engineering and is conducive to the popularization and application of industrialization, so it has good economic and social benefits.

DESCRIPTION OF THE PREFERRED EMBODIMENTS

Figure 1:
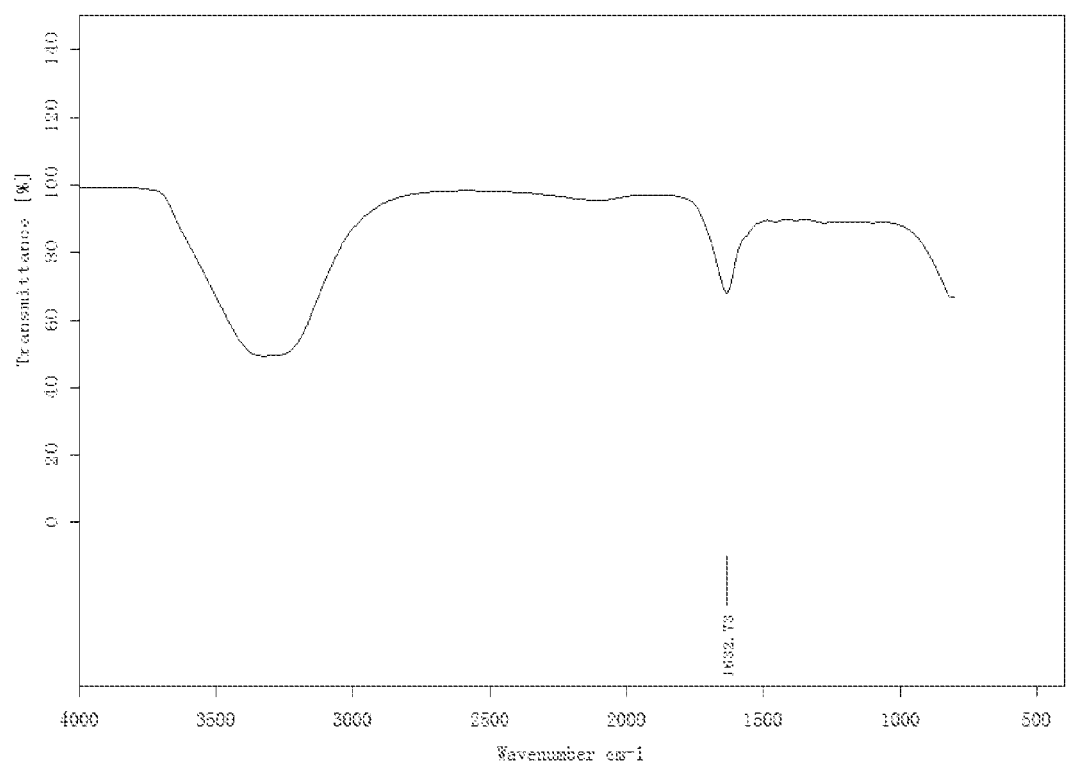
FIG. 1 is the infrared spectrum of comb structure temperature-responsive polycarboxylic acid at T=40° C. in embodiment 1.
Figure 2:
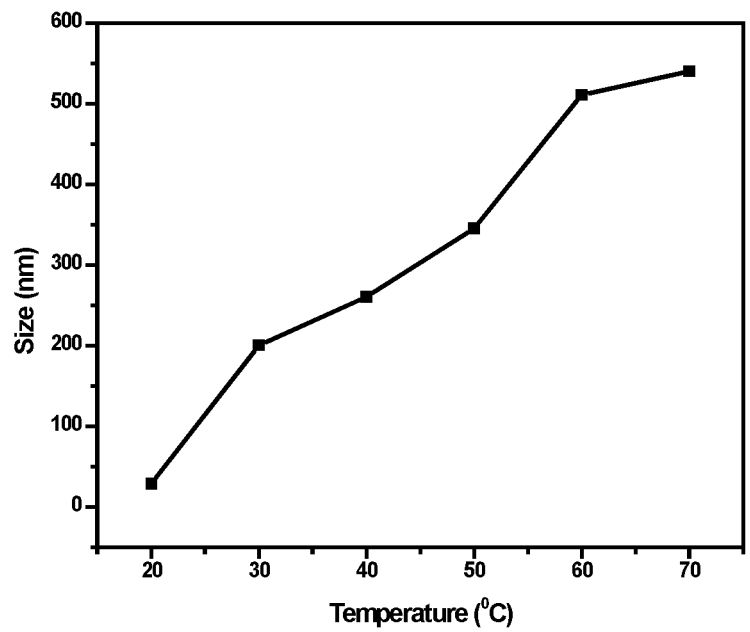
FIG. 2 shows the variation of particle size of comb structure temperature-responsive polycarboxylic acid with temperature in embodiment 1. The temperature is 20° C., 30° C., 40° C., 50° C., 60° C., 70° C.
Figure 3:
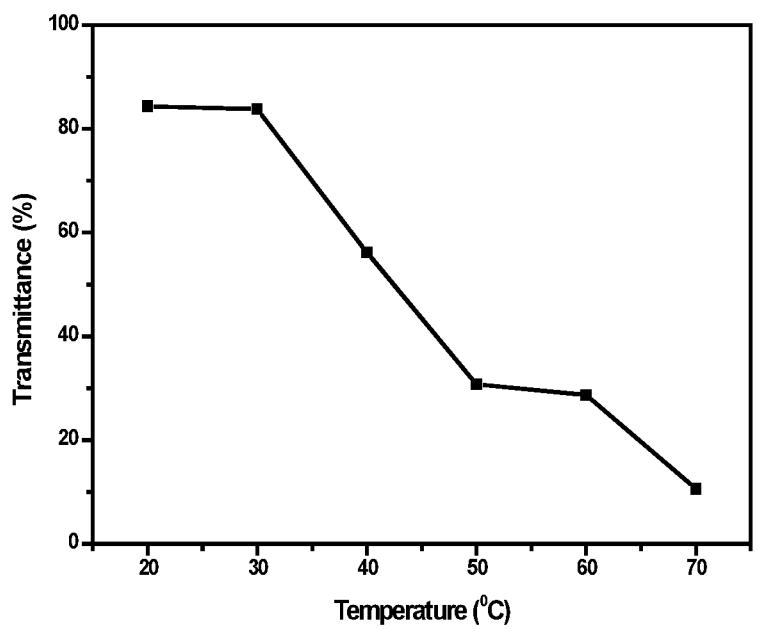
FIG. 3 shows the variation of transmittance of comb structure temperature-responsive polycarboxylic acid with temperature in embodiment 1. The temperature is 20° C., 30° C., 40° C., 50° C., 60° C., 70° C.
Figure 4:
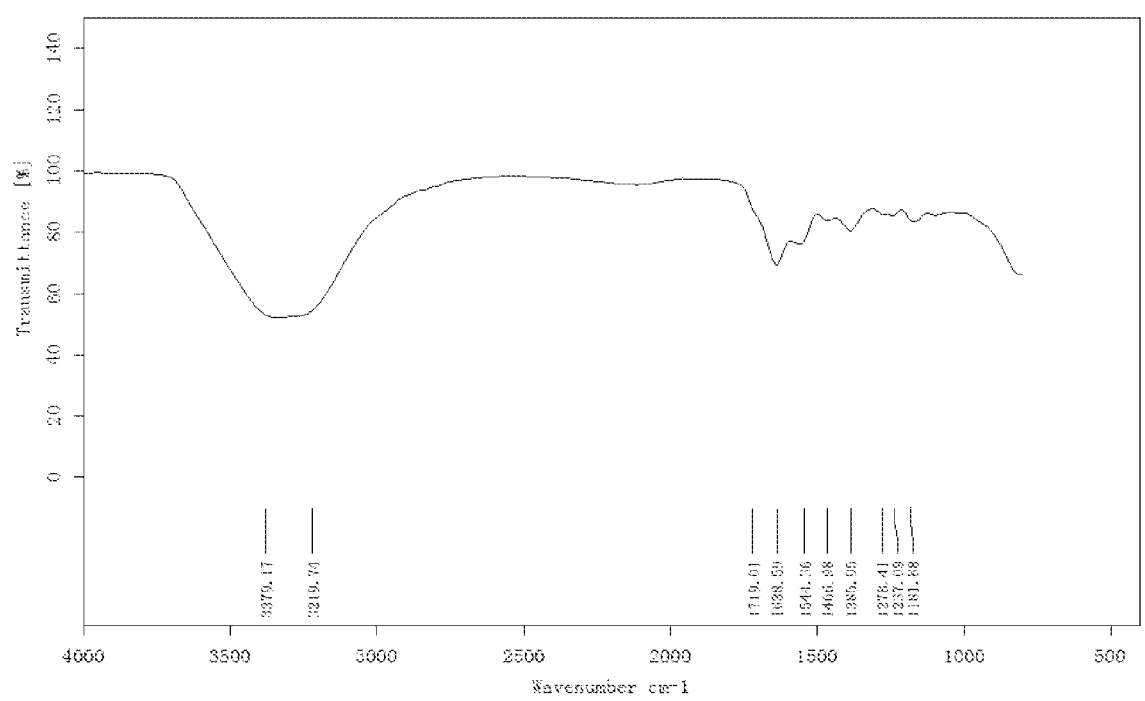
FIG. 4 is the infrared spectrum of comb structure pH-responsive polycarboxylic acid at pH=1 in embodiment 1.
Figure 5:
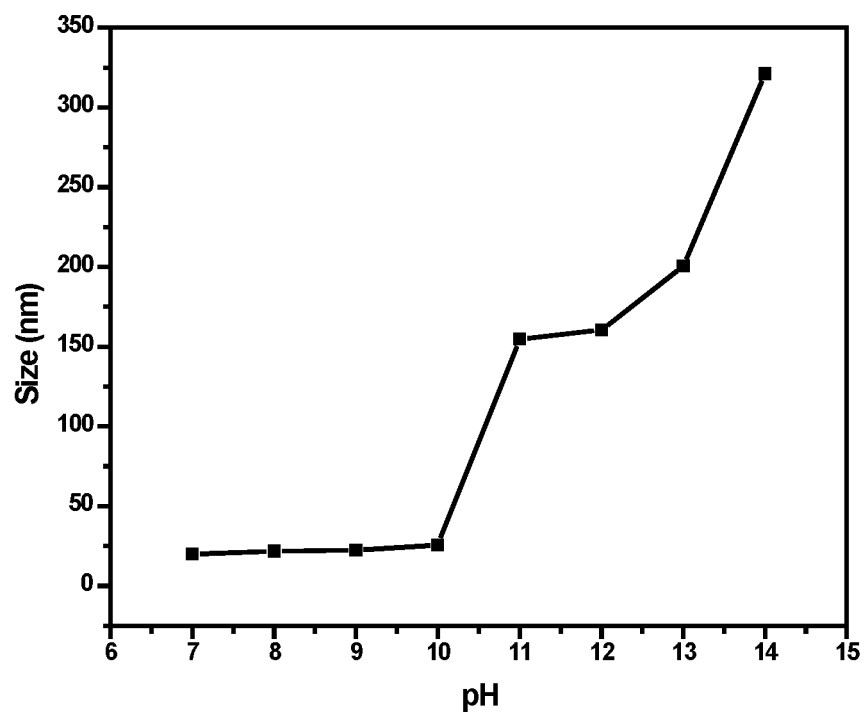
FIG. 5 shows the variation of particle size of comb structure pH-responsive polycarboxylic acid with pH in embodiment 1. The pH is 7, 8, 9, 10, 11, 12, 13, 14.
Figure 6:
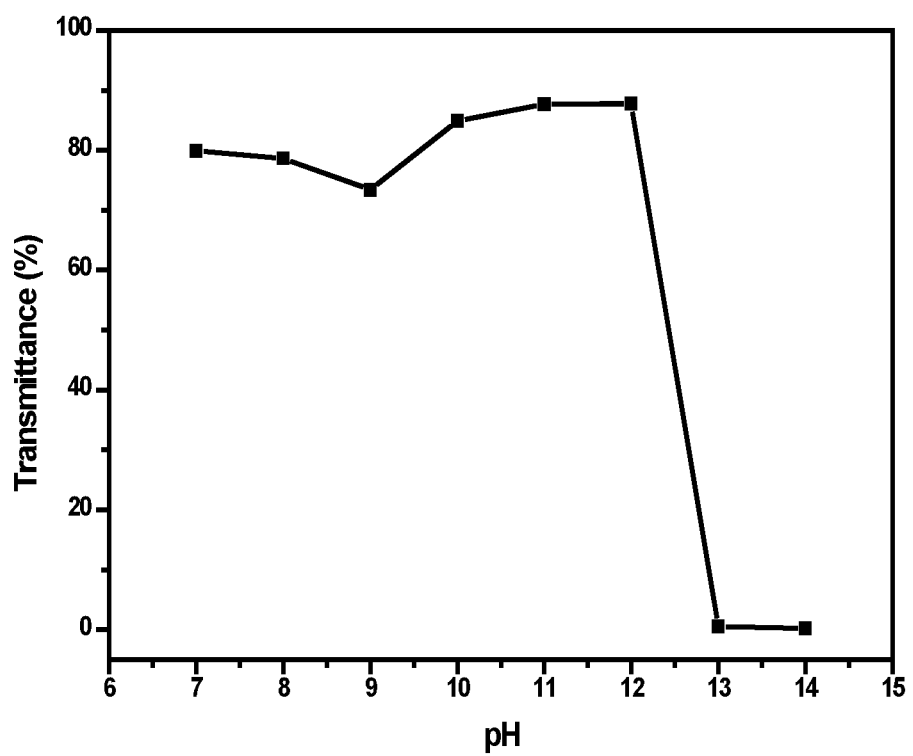
FIG. 6 shows the variation of transmittance of comb structure pH-responsive polycarboxylic acid with pH in embodiment 1. The pH is 7, 8, 9, 10, 11, 12, 13, 14.

The invention is further described in detail in the following embodiments, but the implementation of the invention is not limited to this.

Embodiment 1

Firstly, 72.81 g N,N-dimethylformamide is added to the reactor and heat to 70° C., then 7.11 g azobisvaleronitrile is added with 25 minutes agitation until the mixture is evenly mixed; the mixture solution of 24.27 g N-Isopropylmethacrylamide and 1.49 g 2-mercaptoethanol is introduced for 10 hours, after dropping, the self-polymerization product polyN-isopropylmethacrylamide solution is obtained by reacting at a constant temperature of 700 for 5 hours; 9.68 g allyl bromide, 10.34 g N,N-diisopropyl ethylamine and 0.19 g benzyltrimethylammonium chloride are successively added into the self-polymerization product solution, adjust the temperature to 50° C. with agitation and keep the reaction at a constant temperature of 50° C. for 12 hours, remove N,N-dimethyl formamide and excess reagent to obtain unsaturated polyN-isopropylmethacrylamide macromonemer by means of decompressed distillation; 27.37 g unsaturated polyN-isopropylmethacrylamide macromonemer is dissolved in 16.42 g solvent water and heat to 60° C., agitate 25 minutes until the mixture is evenly mixed; 27.03 g potassium persulfate aqueous solution with 3% mass fraction, 172.18 g methacrylic acid aqueous solution with 3% mass fraction and 20.02 g isopropanol aqueous solution with 3% mass fraction are added at the same time for 2 hours, after dropping, the reaction is kept at a constant temperature of 60° C. for 5 hours to obtain temperature-responsive polycarboxylic acid solution with 10% mass concentration after adding 71.69 g water.

Embodiment 2

Firstly, 91.60 g aniline is added to the reactor and heat to 90° C., then 5.10 g benzoyl peroxide is added with 20 minutes agitation until the mixture is evenly mixed; the mixture solution of 18.32 g N-n-propylacrylamide and 2.98 g 3-mercapto propanol is introduced for 8 hours, after dropping, the self-polymerization product PolyN-N-propyl acrylamide solution is obtained by reacting at a constant temperature of 90° C. for 4 hours; 8.15 g 3-chloro-2-methylpropene, 13.95 g tetramethylethylenediamine and 0.27 g benzyl triethyl ammonium chloride are successively added into the self-polymerization product solution, adjust the temperature to 700 with agitation and keep the reaction at a constant temperature of 70° C. for 9 hours, remove aniline and excess reagent to obtain unsaturated polyN-n-propyl acrylamide macromonemer by means of decompressed distillation; 23.05 g unsaturated polyN-n-propyl acrylamide macromonemer is dissolved in 18.44 g solvent water and heat to 70° C., agitate 20 minutes until the mixture is evenly mixed; 18.57 g sodium persulfate aqueous solution with 5% mass fraction, 117.09 g itaconic acid aqueous solution with 10% mass fraction and 25.47 g 3-mercaptopropionic acid aqueous solution with 5% mass fraction are added at the same time for 3 hours, after dropping, the reaction is kept at a constant temperature of 70° C. for 4 hours to obtain temperature-responsive polycarboxylic acid solution with 20% mass concentration after adding 8.15 g water.

Embodiment 3

Firstly, 280.56 g tetrahydrofuran is added to the reactor and heat to 120° C., then 1.72 g di-tert-butyl peroxide is added with 10 minutes agitation until the mixture is evenly mixed; the mixture solution of 23.38 g N,N-dimethylacrylamide and 11.06 g 2-mercaptoethanol is introduced for 1 hours, after dropping, the self-polymerization product polyN-N-dimethylacrylamide solution is obtained by reacting at a constant temperature of 120° C. for 1 hours; 10.71 g allyl chloride, 217.14 g N,N-diisopropyl ethylamine and 0.72 g tetraethyl ammonium iodide are successively added into the self-polymerization product solution, adjust the temperature to 120° C. with agitation and keep the reaction at a constant temperature of 120° C. for 2 hours, remove tetrahydrofuran and excess reagent to obtain unsaturated polyN,N-dimethylacrylamide macromonemer by means of decompressed distillation; 29.05 g unsaturated polyN,N-dimethylacrylamide macromonemer is dissolved in 34.86 g solvent water and heat to 90° C., agitate 10 minutes until the mixture is evenly mixed; 189.22 g potassium persulfate aqueous solution with 1% mass fraction, 336.28 g acrylic acid aqueous solution with 30% mass fraction and 64.48 g mercaptoacetic acid aqueous solution with 1% mass fraction are added at the same time for 6 hours, after dropping, the reaction is kept at a constant temperature of 90° C. for 1 hours to obtain temperature-responsive polycarboxylic acid solution with 5% mass concentration after adding 192.78 g water.

Embodiment 4

Firstly, 395.82 g dimethyl sulfoxide is added to the reactor and heat to 110° C., then 5.54 g tert-butyl peroxybenzoate is added with 12 minutes agitation until the mixture is evenly mixed; the mixture solution of 43.98 g N,N'-methylenebisacrylamide and 11.15 g 2-mercaptoethanol is introduced for 3 hours, after dropping, the self-polymerization product polyN,N'-methylene-bisacrylamide solution is obtained by reacting at a constant temperature of 110° C. for 2 hours; 14.64 g 1-chloro-3-methyl-2-butene, 180.95 g N,N-diisopropylethylamine and 1.35 g tetrabutylammonium bromide are successively added into the self-polymerization product solution, adjust the temperature to 110° C. with agitation and keep the reaction at a constant temperature of 110° C. for 4 hours, remove dimethyl sulfoxide and excess reagent to obtain unsaturated polyN,N'-methylene-bisacrylamide macromonemer by means of decompressed distillation; 64.85 g unsaturated polyN,N'-methylene-bisacrylamide macromonemer is dissolved in 64.85 g solvent water and heat to 85° C., agitate 12 minutes until the mixture is evenly mixed; 39.93 g ammonium persulfate aqueous solution with 8% mass fraction, 325.10 g fumaric acid aqueous solution with 3% mass fraction and 128.97 g mercaptoacetic acid aqueous solution with 1% mass fraction are added at the same time for 5 hours, after dropping, the reaction is kept at a constant temperature of 85° C. for 2 hours to obtain temperature-responsive polycarboxylic acid solution with 10% mass concentration after adding 170.76 g water.

Embodiment 5

Firstly, 253.96 g cyclobutyl sulfone is added to the reactor and heat to 100° C., then 3.09 g tert-butyl hydroperoxide is added with 15 minutes agitation until the mixture is evenly mixed; the mixture solution of 36.28 g N-tert-butyl acrylamide and 15.32 g 6-mercapto-1-hexanol is introduced for 5 hours, after dropping, the self-polymerization product polyN-tert-butyl acrylamide solution is obtained by reacting at a constant temperature of 100° C. for 3 hours; 30.81 g 4-bromo-1-butene, 72.22 g pyridine and 1.27 g tetrabutyl ammonium chloride are successively added into the self-polymerization product solution, adjust the temperature to 90° C. with agitation and keep the reaction at a constant temperature of 90° C. for 6 hours, remove cyclobutyl sulfone and excess reagent to obtain unsaturated polyN-tert-butyl acrylamide macromonomer by means of decompressed distillation; 62.84 g unsaturated polyN-tert-butyl acrylamide macromonomer is dissolved in 56.56 g solvent water and heat to 80° C., agitate 15 minutes until the mixture is evenly mixed; 46.51 g hydrogen peroxide aqueous solution with 1% mass fraction, 228.81 g maleic anhydride aqueous solution with 30% mass fraction and 27.20 g sodium formate aqueous solution with 5% mass fraction are added at the same time for 4 hours, after dropping, the reaction is kept at a constant temperature of 80° C. for 3 hours to obtain temperature-responsive polycarboxylic acid solution with 20% mass concentration after adding 60.65 g water.

Embodiment 6

Firstly, 23.71 g tetrahydrofuran is added to the reactor and heat to 50° C., then 6.88 g azodiisobutyronitrile is added with 30 minutes agitation until the mixture is evenly mixed; the mixture solution of 23.71 g N-Isopropyl acrylamide and 1.41 g 6-mercapto-1-hexanol is introduced for 12 hours, after dropping, the self-polymerization product polyN-isopropyl acrylamide solution is obtained by reacting at a constant temperature of 50° C. for 6 hours; 3.06 g allyl chloride, 2.02 g triethylamine and 0.20 g tetrabutyl ammonium bisulfate are successively added into the self-polymerization product solution, adjust the temperature to 30° C. with agitation and keep the reaction at a constant temperature of 30° C. for 15 hours, remove tetrahydrofuran and excess reagent to obtain unsaturated polyN-isopropyl acrylamide macromonomer by means of decompressed distillation; 25.54 g unsaturated polyN-isopropyl acrylamide macromonemer is dissolved in 12.77 g solvent water and heat to 50° C., agitate 30 minutes until the mixture is evenly mixed; 45.64 g ammonium persulfate aqueous solution with 1% mass fraction, 72.06 g acrylic acid aqueous solution with 1% mass fraction and 36.04 g isopropyl alcohol aqueous solution with 1% mass fraction are added at the same time for 1 hours, after dropping, the reaction is kept at a constant temperature of 50° C. for 6 hours to obtain temperature-responsive polycarboxylic acid solution with 10% mass concentration after adding 108.87 g water.

Shrinkage Reduction of Cement Mortar

The proportion of cement mortar materials is: 647 kg/m$^3$ cement, 1293 kg/m$^3$ sand with particle size of 0-2 mm and 453 kg/m$^3$ water, the amount of water reducer adulteration is 0.75% cement content (solid content), set the temperature-responsive polycarboxylic acid solution synthesized by the invention has a solid content is 0.3% of the cement content. Cement mortar without adding temperature-responsive polycarboxylic acid is used as the comparison with the same composition of rest components. The results of shrinkage test of mortar are shown in Table 1.

TABLE 1

| polymer | adulterate amount % | 1 d[mm/m] | 7 d[mm/m] | 14 d[mm/m] | 28 d[mm/m] |
| --- | --- | --- | --- | --- | --- |
| Embodiment 1 | 0.3 | −0.03 | −0.20 | −0.37 | −0.51 |
| Embodiment 2 | 0.3 | −0.13 | −0.41 | −0.54 | −0.76 |
| Embodiment 3 | 0.3 | −0.06 | −0.27 | −0.43 | −0.64 |
| Embodiment 4 | 0.3 | −0.07 | −0.32 | −0.44 | −0.67 |
| Embodiment 5 | 0.3 | −0.11 | −0.38 | −0.51 | −0.70 |
| Embodiment 6 | 0.3 | −0.09 | −0.35 | −0.47 | −0.69 |
| comparison | 0 | −0.16 | −0.45 | −0.69 | −1.00 |

Table 1 indicates that the temperature-responsive polycarboxylic acid synthesized by the embodiment of the invention can significantly inhibit the shrinkage of cement mortar. This type of polycarboxylic acid uses the temperature response characteristics of the block polymer on the side chain of its macromolecular to achieve the reduction effect which is different from the action mechanism of typical concrete shrinkage reducer. It can be seen from the shrinkage results in table 1 that the temperature-responsive polycarboxylic acid synthesized by the embodiment of the present invention can effectively reduce the drying shrinkage of concrete, the reduction rate is better than the comparison in 1d, 7d, 14d and 28d.

Embodiment 7

Firstly, 360 g tetrahydrofuran is added to the reactor and heat to 120° C., then 1.72 g di-tert-butyl peroxide is added with 10 minutes agitation until the mixture is evenly mixed; the mixture solution of 30 g N,N-diethyl-2-acrylamide and 11.06 g 2-mercaptoethanol is introduced for 1 hours, after dropping, the self-polymerization product polyN,N-diethyl-2-acrylamide solution is obtained by reacting at a constant temperature of 120° C. for 1 hours; 10.71 g allyl chloride, 17.14 g N,n-diisopropyl ethylamine and 0.72 g tetraethyl ammonium iodide are successively added into the self-polymerization product solution, adjust the temperature to 120° C. with agitation and keep the reaction at a constant temperature of 120° C. for 2 hours, remove tetrahydrofuran and excess reagent to obtain unsaturated polyN,N-diethyl-2-acrylamide macromonomer by means of decompressed distillation; 46.66 g unsaturated polyN,N-diethyl-2-acrylamide macromonemer is dissolved in 56.10 g solvent water and heat to 90° C., agitate 10 minutes until the mixture is evenly mixed; 189.22 g potassium persulfate aqueous solution with 1% mass fraction, 336.28 g crylic acid aqueous solution with 30% mass fraction and 64.48 g mercaptoacetic acid aqueous solution with 1% mass fraction are added at the same time for 6 hours, after dropping, the reaction is kept at a constant temperature of 90° C. for 1 hours to obtain pH-responsive polycarboxylic acid solution with 5% mass concentration after adding 343.27 g water.

Embodiment 8

Firstly, 270 g dimethyl sulfoxide is added to the reactor and heat to 110° C., then 5.54 g tert-butyl peroxybenzoate is added with 12 minutes agitation until the mixture is evenly mixed; the mixture solution of 30 g 4-vinyl pyridine and 11.15 g 2-mercaptoethanol is introduced for 3 hours, after dropping, the self-polymerization product poly4-vinyl pyridine solution is obtained by reacting at a constant temperature of 110° C. for 2 hours; 14.64 g 1-chloro-3-methyl-2-butene, 180.95 g N,N-diisopropyl ethylamine and 1.35 g tetrabutyl ammonium bromide are successively added into the self-polymerization product solution, adjust the temperature to 110° C. with agitation and keep the reaction at a constant temperature of 110° C. for 4 hours, remove dimethyl sulfoxide and excess reagent to obtain unsaturated poly4-vinyl pyridine macromonemer by means of decompressed distillation; 50.68 g unsaturated poly4-vinyl pyridine macromonemer is dissolved in 50.68 g solvent water and heated to 85° C., agitate 12 minutes until the mixture is evenly mixed; 39.93 g ammonium persulfate aqueous solution with 8% mass fraction, 325.1 g fumaric acid aqueous solution with 3% mass fraction and 128.97 g mercaptoacetic acid aqueous solution with 1% mass fraction are added at the same time for 5 hours, after dropping, the reaction is kept at a constant temperature of 85° C. for 2 hours to obtain pH-responsive polycarboxylic acid solution with 10% mass concentration after adding 175.36 g water.

Embodiment 9

Firstly, 150 g aniline is added to the reactor and heat to 90° C., then 5.10 g benzoyl peroxide is added with 20 minutes agitation until the mixture is evenly mixed; the mixture solution of 30 g diethylamino-ethyl methacrylate and 2.98 g 3-mercapto propanol is introduced for 8 hours, after dropping, the self-polymerization product polyethylamino-ethyl methacrylate solution is obtained by reacting at a constant temperature of 90° C. for 4 hours; 8.15 g 3-chloro-2-methylpropene, 13.95 g tetramethylethylenediamine and 0.27 g benzyltriethyl chloride are successively added into the self-polymerization product solution, adjust the temperature to 70° C. with agitation and keep the reaction at a constant temperature of 70° C. for 9 hours, remove aniline and excess reagent to obtain unsaturated polyethylamino-ethyl methacrylate macromonemer by means of decompressed distillation; 34.61 g unsaturated polyethylamino-ethyl methacrylate macromonemer is dissolved in 27.68 g solvent water and heat to 70° C., agitate 20 minutes until the mixture is evenly mixed; 18.57 g sodium persulfate aqueous solution with 5% mass fraction, 117.09 g itaconic acid aqueous solution with 10% mass fraction and 25.47 g 3-mercaptopropionic acid aqueous solution with 5% mass fraction are added at the same time for 3 hours, after dropping, the reaction is kept at a constant temperature of 70° C. for 4 hours to obtain pH-responsive polycarboxylic acid solution with 20% mass concentration after adding 23.06 g water.

Embodiment 10

Firstly, 30 g tetrahydrofuran is added to the reactor and heat to 50° C., then 6.88 g azodiisobutyronitrile is added with 30 minutes agitation until the mixture is evenly mixed; the mixture solution of 30 g dimethylaminoethyl acrylate and 1.41 g 6-mercapto-1-hexanol is introduced for 1 hours, after dropping, the self-polymerization product dimethylaminoethyl polyacrylate solution is obtained by reacting at a constant temperature of 50° C. for 6 hours; 3.06 g allyl chloride 2.02 g triethylamine and 0.20 g tetrabutyl ammonium sulfate successively added into the self-polymerization product solution, adjust the temperature to 30° C. with agitation and keep the reaction at a constant temperature of 30° C. for 15 hours, remove aniline and excess reagent to obtain unsaturated dimethylaminoethyl polyacrylate macromonemer by means of decompressed distillation; 31.81 g unsaturated dimethylaminoethyl polyacrylate macromonemer is dissolved in 15.90 g solvent water and heat to 50° C., agitate 30 minutes until the mixture is evenly mixed; 45.64 g ammonium persulfate aqueous solution with 1% mass fraction, 72.06 g crylic acid aqueous solution with 1% mass fraction and 36.04 g isopropanol aqueous solution with 1% mass fraction are added at the same time for 1 hours, after dropping, the reaction is kept at a constant temperature of 50° C. for 6 hours to obtain pH-responsive polycarboxylic acid solution with 10% mass concentration after adding 171.53 g water.

Embodiment 11

Firstly, 90 g N,N-dimethylformamide is added to the reactor and heat to 70° C., then 7.11 g azodiisoheptanitrile is added with 25 minutes agitation until the mixture is evenly mixed; the mixture solution of 30 g dimethylaminoethyl methacrylate and 1.49 g 2-mercaptoethanol is introduced for 10 hours, after dropping, the self-polymerization product dimethylaminoethyl polymethacrylate solution is obtained by reacting at a constant temperature of 70° C. for 5 hours; 9.68 g allyl bromide, 10.34 g N,N-diisopropyl ethylamine and 0.19 g benzyltrimethylammonium chloride successively added into the self-polymerization product solution, adjust the temperature to 50° C. with agitation and keep the reaction at a constant temperature of 50° C. for 12 hours, remove N,N-dimethylformamide and excess reagent to obtain unsaturated dimethylaminoethyl polymethacrylate macromonemer by means of decompressed distillation; 33.18 g unsaturated dimethylaminoethyl polymethacrylate macromonemer is dissolved in 19.91 g solvent water and heat to 60° C., agitate 25 minutes until the mixture is evenly mixed; 27.03 g potassium persulfate aqueous solution with 3% mass fraction, 172.18 g methacrylic acid aqueous solution with 3% mass fraction and 20.02 g isopropanol aqueous solution with 3% mass fraction are added at the same time for 2 hours, after dropping, the reaction is kept at a constant temperature of 60° C. for 5 hours to obtain pH-responsive polycarboxylic acid solution with 10% mass concentration after adding 129.79 g water.

Embodiment 12

Firstly, 210 g cyclobutyl sulfone is added to the reactor and heat to 100° C., then 3.09 g tert-butyl hydroperoxide is added with 15 minutes agitation until the mixture is evenly mixed; the mixture solution of 30 g 2-vinylpyridine and 15.32 g 6-mercapto hexanol is introduced for 5 hours, after dropping, the self-polymerization product poly2-vinylpyridine solution is obtained by reacting at a constant temperature of 100° C. for 3 hours; 30.81 g 4-bromo-1-butene, 72.22 g pyridine and 1.27 g tetrabutyl ammonium chloride successively added into the self-polymerization product solution, adjust the temperature to 90° C. with agitation and keep the reaction at a constant temperature of 90° C. for 6 hours, remove cyclobutyl sulfone and excess reagent to obtain unsaturated poly2-vinylpyridine macromonemer by means of decompressed distillation; 56.56 g unsaturated poly2-vinylpyridine macromonemer is dissolved in 50.90 g solvent water and heat to 80° C., agitate 15 minutes until the mixture is evenly mixed; 46.57 g hydrogen peroxide aqueous solution with 1% mass fraction, 228.81 g maleic anhydride aqueous solution with 30% mass fraction and 27.20 g sodium formate aqueous solution with 5% mass fraction are added at the same time for 4 hours, after dropping, the reaction is kept at a constant temperature of 80° C. for 3 hours to obtain pH-responsive polycarboxylic acid solution with 20% mass concentration after adding 29.25 g water.

Shrinkage Reduction of Cement Mortar

The proportion of cement mortar materials is: 647 kg/m$^3$ cement, 1293 kg/m$^3$ sand with particle size of 0-2 mm and 453 kg/m$^3$ water, the amount of water reducer adulteration is 0.75% cement content (solid content), set the pH-responsive polycarboxylic acid solution synthesized by the invention has a solid content is 0.3% of the cement content. Cement mortar without adding temperature-responsive polycarboxylic acid is used as the comparison with the same composition of rest components. The results of shrinkage test of mortar are shown in Table 2.

TABLE 2

| polymer | adulterate amount % | 1 d[mm/m] | 7 d[mm/m] | 14 d[mm/m] | 28 d[mm/m] |
|---|---|---|---|---|---|
| Embodiment 7 | 0.3 | −0.02 | −0.25 | −0.35 | −0.49 |
| Embodiment 8 | 0.3 | −0.12 | −0.42 | −0.58 | −0.74 |
| Embodiment 9 | 0.3 | −0.07 | −0.38 | −0.43 | −0.63 |
| Embodiment 10 | 0.3 | −0.04 | −0.30 | −0.40 | −0.59 |
| Embodiment 11 | 0.3 | −0.09 | −0.41 | −0.53 | −0.65 |
| Embodiment 12 | 0.3 | −0.08 | −0.39 | −0.48 | −0.70 |
| comparison | 0 | −0.16 | −0.45 | −0.69 | −1.00 |

Table 2 indicates that the pH-responsive polycarboxylic acid synthesized by the embodiment of the invention can significantly inhibit the shrinkage of cement mortar, the principle of shrinkage reduction is to utilize the action of pH-responsive polymer blocks on the side chains of macromolecules, which is one of the most remarkable characteristics that distinguishes it from other concrete shrinkage reducing agents. In terms of shrinkage performance, the polymer synthesized by the embodiment of the present invention can effectively reduce the drying shrinkage of concrete, the reduction rate is better than the comparison in 1d, 7d, 14d and 28d.

What is claimed is:

1. A method for preparing comb structure temperature-responsive polycarboxylic acid with end-group functionalization via self-polymerization, substitution and co-polymerization, the method comprising the following steps:
   (1) self-polymerization: firstly, an organic solvent is added to a reactor and heated to 50-120° C., introducing an initiator with 10-30 minutes agitation until a mixture thereof is evenly mixed, and then a mixture solution of a temperature-responsive monomer and an end-group functional agent is introduced by dropping for 1-12 hours, after dropping is completed, a self-polymerization product solution is obtained by reacting at a constant temperature of 50-120° C. for 1-6 hours;
   (2) substitution: an unsaturated halogenated hydrocarbon, an acid-binding agent and a catalyst are successively added into the self-polymerization product solution obtained in step (1), adjust the temperature to 30-120° C. with agitation and keep the reaction at a constant temperature of 30-120° C. for 2-15 hours to obtain unsaturated temperature-responsive macromonomer by decompressed distillation;
   (3) co-polymerization: the unsaturated temperature-responsive macromonomer obtained in step (2) is dissolved in solvent water and heated to 50-90° C., agitate 10-30 minutes until the mixture thereof is evenly mixed, an aqueous solution of initiator with 1-10% mass fraction, an aqueous solution of carboxylic acid small monomer with 1-30% mass fraction and an aqueous solution of chain transfer agent with 1-5% mass fraction are added at the same time by dropping for 1-6 hours, after dropping is completed, the reaction is kept at a constant temperature of 50-90° C. for 1-6 hours to obtain a temperature-responsive polycarboxylic acid solution with required concentration after adding water;

wherein the organic solvent used in the self-polymerization reaction in step (1) is: tetrahydrofuran, N, N-dimethyl formamide, aniline, cyclobutyl sulfoxide or dimethyl sulfoxide, the mass ratio of the organic solvent to the temperature-responsive monomer is 1-12:1; the initiator used in the self-polymerization reaction in step (1) is: azodiisobutyl nitrile, azodiisoheptyl nitrile, dibenzoyl peroxide, tert-butyl hydrogen peroxide, tert-butyl peroxide benzoate or ditert-butyl peroxide, the molar ratio of the initiator to the temperature-responsive monomer is 0.05-0.2:1; the temperature-responsive monomer used in the self-polymerization reaction in step (1) is: N-Isopropyl acrylamide, N-isopropyl methylacrylamide, N-n-propyl acrylamide, N-tert-butyl acrylamide, N,N'-methylene diacrylamide or N,N-dimethylacrylamide; the end group functionalizing agent used in the self-polymerization reaction in step (1) is: 6-mercapto hexanol, 2-mercapto ethanol or 3-mercapto propanol, the molar ratio of the end group functionalizing agent to the temperature-responsive monomer is 0.05-0.6:1;

the unsaturated halogenated hydrocarbon used in the substitution reaction in step (2) is: allyl chloride, allyl bromide, 3-chloro-2-methylpropylene, 4-bromo-1-butene or 1-chloro-3-methyl-2-butene, the molar ratio of the unsaturated halogenated hydrocarbon to the self-polymerization product in step (1) is 1-4:1; the acid-binding agent used in the substitution reaction in step (2) is: triethylamine, N,N-diisopropyl ethylamine, tetramethylenediamine or pyridine, the molar ratio of the acid-binding agent to the self-polymerization product in (1) is 2-12:1; the catalyst used in the substitution reaction in step (2) is: ammonium tetrabutyl sulfate, benzyl trimethylammonium chloride, benzyl triethyl ammonium chloride, tetrabutyl ammonium chloride, tetrabutyl ammonium bromide or tetrabutyl ammonium iodide, the molar ratio of the catalyst to the self-polymerization product in step (1) is 0.02-0.06:1;

the mass ratio between the solvent water used in the copolymerization reaction in step (3) and the unsaturated temperature-responsive macromonomer obtained in step (2) is 0.5-1.2:1; a solute in the aqueous solution of initiator is: ammonium persulfate, potassium persulfate, sodium persulfate, or hydrogen peroxide, the molar ratio of the solute to the unsaturated temperature-responsive macromonomer in step (2) is: 0.05-0.2:1; a solute in the aqueous solution of carboxylic acid small monomer is: acrylic acid, methacrylic acid, itaconic acid, maleic anhydride or fumaric acid, the molar ratio of the solute to the unsaturated temperature-responsive macromonomer in step (2) is: 1-10:1; a solute in the aqueous solution of chain transfer agent is: isopropanol, thioglycolic acid, 3-thioglycolic acid or sodium formate, the molar ratio of the solute to the unsaturated temperature-responsive macromonomer in step (2) is: 0.05-0.6:1.

2. A comb structure temperature-responsive polycarboxylic acid prepared by the method according to claim 1, having the following structural expression:

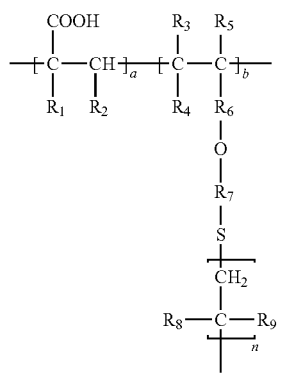

where, $R_1$ represents hydrogen, methyl, or methylene carboxyl groups; $R_2$ represents hydrogen or carboxyl; $R_3$, $R_4$ and $R_5$ represents hydrogen or methyl; $R_6$ represents methylene or dimethylene; $R_7$ represents dimethylene, trimethylene, or hexamethylene; $R_8$ represents N-Isopropyl methyl amides, N-n-propyl amides, N-tert-butyl amides, N-methylene, N,N'-acrylamide or N,N-dimethyl acyl; $R_9$ represents hydrogen or methyl;

wherein a and b are positive integers indicating the number of repeating units distributed randomly in main molecular chains, a:b=1-10:1;

wherein n is a positive integer, indicating the number of repeat units in side molecular chains, a range of n is 5-120.

3. A method for preparing comb structure pH-responsive polycarboxylic acid with end-group functionalization via self-polymerization, substitution and co-polymerization, the method comprising the following steps:

(1) self-polymerization: firstly, an organic solvent is added to a reactor and heated to 50-120° C., introducing an initiator with 10-30 minutes agitation until a mixture thereof is evenly mixed, and then a mixture solution of a pH-responsive monomer and an end-group functional agent is introduced by dropping for 1-12 hours, after dropping is completed, a self-polymerization product solution is obtained by reacting at a constant temperature of 50-120° C. for 1-6 hours;

(2) substitution: an unsaturated halogenated hydrocarbon, an acid-binding agent and a catalyst are successively added into the self-polymerization product solution obtained in step (1), adjust the temperature to 30-120° C. with agitation and keep the reaction at a constant temperature of 30-120° C. for 2-15 hours to obtain unsaturated pH-responsive macromonomer by decompressed distillation;

(3) co-polymerization: the unsaturated pH-responsive macromonomer obtained in step (2) is dissolved in solvent water and heated to 50-90° C., agitate 10-30 minutes until the mixture thereof is evenly mixed, an aqueous solution of initiator with 1-10% mass fraction, an aqueous solution of carboxylic acid small monomer with 1-30% mass fraction and an aqueous solution of chain transfer agent with 1-5% mass fraction are added at the same time by dropping for 1-6 hours, after dropping is completed, the reaction is kept at a constant temperature of 50-90° C. for 1-6 hours to obtain a pH-responsive polycarboxylic acid solution with required concentration after adding water;

wherein the organic solvent used in the self-polymerization reaction in step (1) is: tetrahydrofuran, N, N-dimethyl formamide, aniline, cyclobutyl sulfoxide or dimethyl sulfoxide, the mass ratio of the organic solvent to the pH-responsive monomer is 1-12:1; the initiator used in the self-polymerization reaction in step (1) is: azodiisobutyl nitrile, azodiisoheptyl nitrile, dibenzoyl peroxide, tert-butyl hydrogen peroxide, tert-butyl peroxide benzoate or ditert-butyl peroxide, the molar ratio of the initiator to the pH-responsive monomer is 0.05-0.2:1; the pH-responsive monomer used in the self-polymerization reaction in step (1) is: dimethylamino-ethyl acrylate, dimethylamino-ethyl methacrylate, diethylamino-ethyl methacrylate, 2-vinyl pyridine, 4-vinyl pyridine or N,N-diethyl-2-acrylamide; the end group functionalizing agent used in the self-polymerization reaction in step (1) is: 6-mercapto hexanol, 2-mercapto ethanol or 3-mercapto propanol, the molar ratio of the end group functionalizing agent to the pH-responsive monomer is 0.05-0.6:1;

the unsaturated halogenated hydrocarbon used in the substitution reaction in step (2) is: allyl chloride, allyl bromide, 3-chloro-2-methylpropylene, 4-bromo-1-butene or 1-chloro-3-methyl-2-butene, the molar ratio of the unsaturated halogenated hydrocarbon to the self-polymerization product in step (1) is 1-4:1; the acid-binding agent used in the substitution reaction in step (2) is: triethylamine, N,N-diisopropyl ethylamine, tetramethylenediamine or pyridine, the molar ratio of the acid-binding agent to the self-polymerization product in (1) is 2-12:1; the catalyst used in the substitution reaction in step (2) is: ammonium tetrabutyl sulfate, benzyl trimethylammonium chloride, benzyl triethyl ammonium chloride, tetrabutyl ammonium chloride, tetrabutyl ammonium bromide or tetrabutyl ammonium iodide, the molar ratio of the catalyst to the self-polymerization product in step (1) is 0.02-0.06:1;

the mass ratio between the solvent water used in the copolymerization reaction in step (3) and the unsaturated pH-responsive macromonomer obtained in step (2) is 0.5-1.2:1; a solute in the aqueous solution of initiator is: ammonium persulfate, potassium persulfate, sodium persulfate, or hydrogen peroxide, the molar ratio of the solute to the unsaturated pH-responsive macromonomer in step (2) is: 0.05-0.2:1; a solute in the aqueous solution of carboxylic acid small monomer is: acrylic acid, methacrylic acid, itaconic acid, maleic anhydride or fumaric acid, the molar ratio of the solute to the unsaturated pH-responsive macromonomer in step (2) is: 1-10:1; a solute in the aqueous solution of chain transfer agent is: isopropanol, thioglycolic acid, 3-thioglycolic acid or sodium formate, the molar ratio of the solute to the unsaturated pH-responsive macromonomer in step (2) is: 0.05-0.6:1.

4. A comb structure pH-responsive polycarboxylic acid prepared by the method according to claim 3, having the following structural expression:

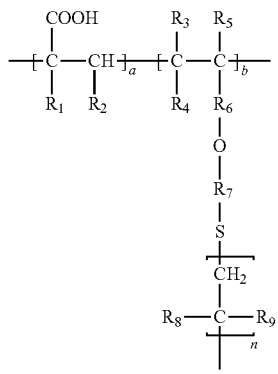

where, $R_1$ represents hydrogen, methyl, or methylene carboxyl groups; $R_2$ represents hydrogen or carboxyl; $R_3$, $R_4$ and $R_5$ represents hydrogen or methyl; $R_6$ represents methylene or dimethylene; $R_7$ represents dimethylene, trimethylene, or hexamethylene; $R_8$ represents dimethylamino-ethyl, diethylamino-ethyl, 2-pyridine, 4-pyridine, or N,N-diethyl-2-amide; $R_9$ represents hydrogen or methyl;

wherein a and b are positive integers indicating the number of repeating units distributed randomly in main molecular chains, a:b=1-10:1;

wherein n is a positive integer, indicating the number of repeat units in side molecular chains, a range of n is 5-120.

* * * * *